(12) United States Patent
Bosco

(10) Patent No.: US 11,837,928 B2
(45) Date of Patent: Dec. 5, 2023

(54) ELECTRIC MOTOR AND WINDING METHOD

(71) Applicant: Alejandro Bosco, Sitges Barcelona (ES)

(72) Inventor: Alejandro Bosco, Sitges Barcelona (ES)

(73) Assignee: Alejandro Bosco, Barcelona (ES)

( * ) Notice: Subject to any disclaimer, the term of this patent is extended or adjusted under 35 U.S.C. 154(b) by 161 days.

(21) Appl. No.: 16/613,908

(22) PCT Filed: May 21, 2018

(86) PCT No.: PCT/IB2018/053583
§ 371 (c)(1),
(2) Date: Nov. 15, 2019

(87) PCT Pub. No.: WO2018/215916
PCT Pub. Date: Nov. 29, 2018

(65) Prior Publication Data
US 2020/0091788 A1      Mar. 19, 2020

Related U.S. Application Data

(60) Provisional application No. 62/509,114, filed on May 21, 2017.

(51) Int. Cl.
*H02K 3/28*      (2006.01)
*H02K 1/14*      (2006.01)

(52) U.S. Cl.
CPC ............... *H02K 3/28* (2013.01); *H02K 1/146* (2013.01); *H02K 2213/06* (2013.01)

(58) Field of Classification Search
CPC ...... H02K 3/28; H02K 1/146; H02K 2213/06; H02K 3/521
USPC .......................................................... 310/208
See application file for complete search history.

(56) References Cited

U.S. PATENT DOCUMENTS

| 4,363,985 | A | * | 12/1982 | Matsuda | ................ | H02K 17/14 |
| | | | | | | 310/184 |
| 4,675,591 | A | * | 6/1987 | Pleiss | ........................ | H02P 1/32 |
| | | | | | | 310/184 |
| 4,761,602 | A | * | 8/1988 | Leibovich | .............. | H02K 17/16 |
| | | | | | | 310/180 |
| 4,937,513 | A | * | 6/1990 | Hoemann | .............. | H02K 17/06 |
| | | | | | | 318/772 |

(Continued)

FOREIGN PATENT DOCUMENTS

| DE | 102 13 743 | 10/2003 |
| DE | 10 2006 061699 | 7/2008 |

(Continued)

*Primary Examiner* — Alex W Mok
(74) *Attorney, Agent, or Firm* — MaxGo Law PLLC

(57) ABSTRACT

An electric motor and winding method that improves its characteristics of torque and speed. An improved electric motor that provides higher power density and safety features by a novel winding architecture. Since the new winding architecture does not affect the measures, design or materials of the electric motor there is no need for any special manufacturing process or extra cost. Therefore the improved electric motors are smaller, lighter and cheaper than the same power size conventional electric motors as in other prior arts. The improved electric motor provides redundancy features against failure.

8 Claims, 4 Drawing Sheets

(56) References Cited

U.S. PATENT DOCUMENTS

| | | | | |
|---|---|---|---|---|
| 4,967,464 A * | 11/1990 | Stephens | ............ | H02K 3/18 |
| | | | | 29/596 |
| 4,995,159 A * | 2/1991 | Hancock | ............ | H02K 19/103 |
| | | | | 29/596 |
| 5,825,111 A * | 10/1998 | Fei | ............ | H02K 17/06 |
| | | | | 310/179 |
| 7,009,320 B2 * | 3/2006 | Akita | ............ | H02K 3/28 |
| | | | | 310/179 |
| 8,922,087 B1 * | 12/2014 | Rittenhouse | ............ | H02P 9/009 |
| | | | | 310/185 |
| 9,018,970 B2 * | 4/2015 | Obata | ............ | G01R 31/346 |
| | | | | 318/806 |
| 9,866,083 B2 * | 1/2018 | Tamura | ............ | H02K 3/28 |
| 2006/0152188 A1 * | 7/2006 | Yasuhara | ............ | H02K 3/28 |
| | | | | 318/727 |
| 2011/0309785 A1 * | 12/2011 | Fargo | ............ | H02P 25/22 |
| | | | | 318/773 |
| 2013/0127391 A1 * | 5/2013 | Lewis | ............ | H02P 25/18 |
| | | | | 318/498 |
| 2014/0210297 A1 | 7/2014 | Shizu | | |
| 2015/0008777 A1 * | 1/2015 | Herbert | ............ | H02K 3/28 |
| | | | | 310/72 |
| 2015/0381000 A1 * | 12/2015 | Tamura | ............ | H02K 3/28 |
| | | | | 310/207 |

FOREIGN PATENT DOCUMENTS

| | | |
|---|---|---|
| JP | 06-22486 | 1/1994 |
| JP | 2013-247714 | 12/2013 |

* cited by examiner

[Fig. 1]
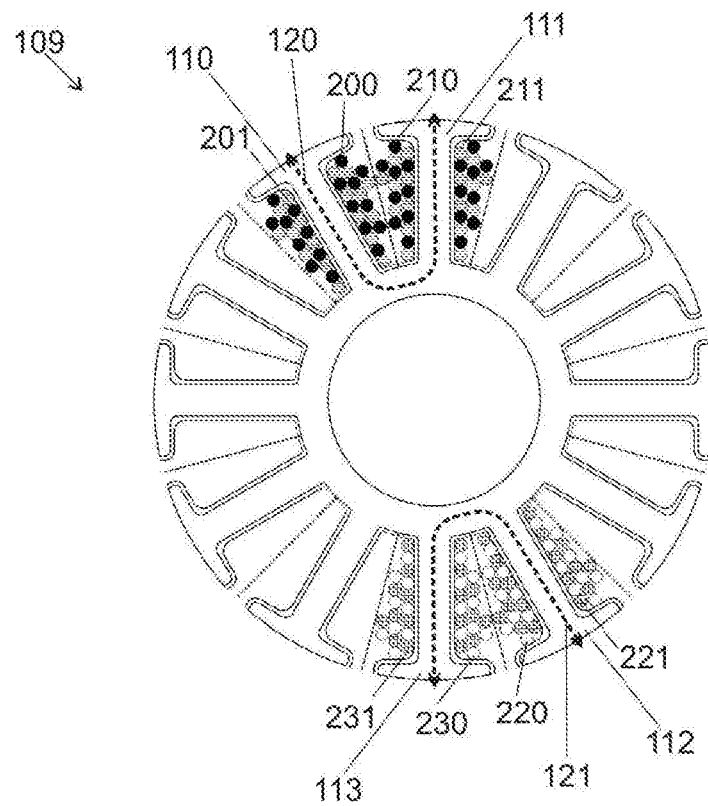
[Fig. 2]
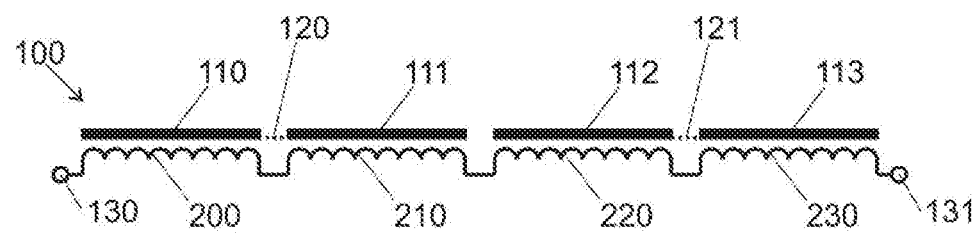
(Prior Art)
[Fig. 3]
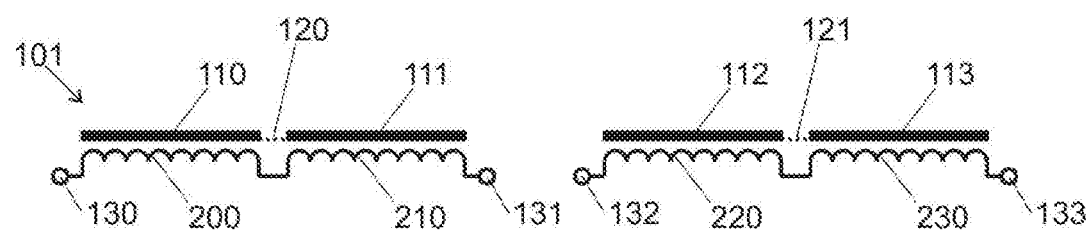

[Fig. 6]
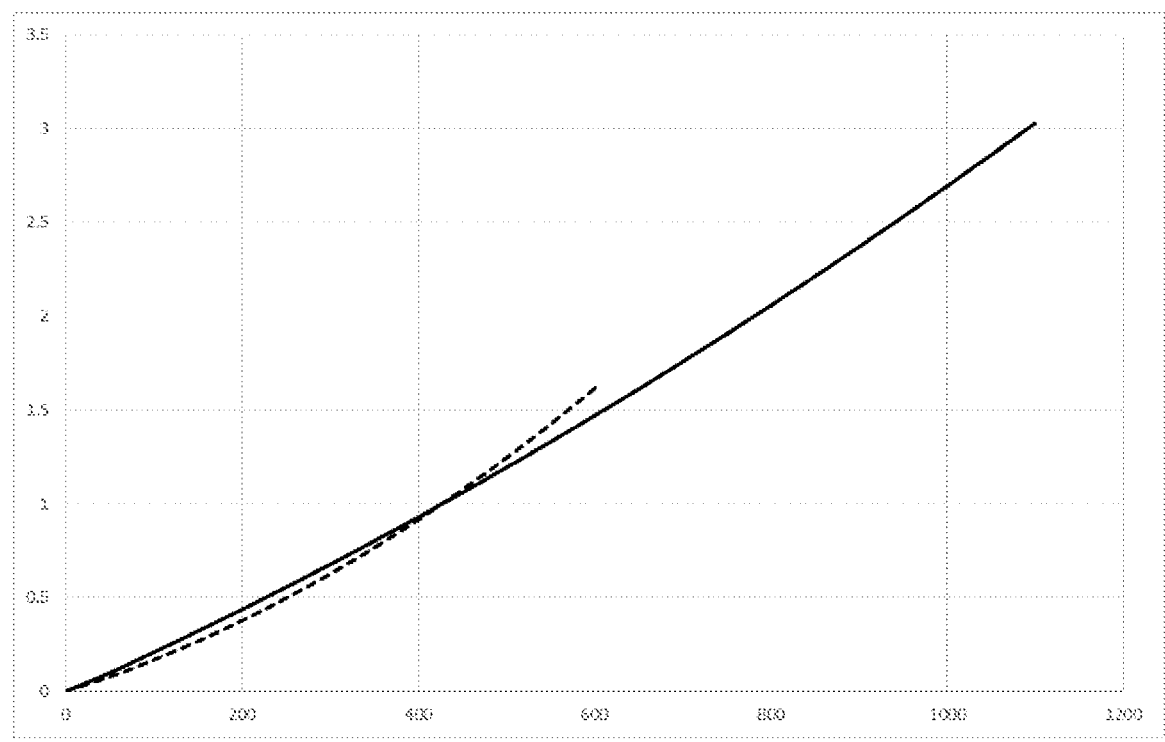

ELECTRIC MOTOR AND WINDING METHOD

The invention provides an electric motor in which the electromagnetic properties of it have been improved by a novel winding arrangement, lowering the voltage of electric current it generates as well as its resistance and inductance, while running. This makes possible to increase the motor performance by extending its torque and speed to higher levels, thereby power density, in comparison with a conventional motor utilizing the same power supply, without any power booster or extra elements. Therefore, being able to increase the power density leads to a size and cost reduction. Added to these features, said motor uses a standard conventional manufacturing process, making it ready to implement in the industry. This invention also provides the electric motor with the feature of redundancy, which makes it possible to keep running with the consequent reduction in power, even if one of the components in a phase fail, it will still give enough power to most likely avoid a catastrophe level. The invention will be explained in further details below with references to the exemplifying embodiments in the drawings but not limiting the invention.

TECHNICAL FIELD

The invention relates to an electric motor and winding method and more particularly to improve its performance and functioning.

BACKGROUND ART

Today's electric motors and driving systems have recently presented improvements enforced by the electric cars, portable machinery, toys and etc. industries which demands cheaper and higher performance devices. The approaches to provide this increase in energy and performance lead to major developments into the electric storage and distribution as well as improve the energy utilization by the devices. Scientifics continued efforts and progress applying latest advanced technology in electronics hardware and software, materials, topologies and architectures are enabling precise control of the electricity usage and conversion in all the mentioned industries but as a result, these solutions are expensive and most likely complex. Still, from the resulting efforts, power expectations from the industry demands are not achieved. There are also specific visions for the implementation of the electric motor in applications that require the special feature of redundancy to safely keep running even in partial failure conditions that are not met in today's electric motors. This discrepancy between the market-industry needs, against the technology offers leaves room for improvements.

Technical Problem

One of the main limitation encountered in a conventional electric motor is, when running, the electric current it generates flows in a sense that goes against the supplied one. This limits the amount of current which the system is able to run through. The maximum current possible is an expression of the momentary difference between the voltage supplied to the motor and the motor generated voltage, thereby defining its maximum torque and speed. As the power of a motor is determined by the torque times the speed, this also establish the power density of said motor. Power density is the relationship between size and power. To affront the industry demand for more power, building the motor bigger will not obtain a cost reduction and neither better energy usage, as said motor will keep the same efficiency and power density. In effort to overcome the mentioned limitation and obtain higher torque and speed, therefore power density from a same size motor, the conventional approach is to leave the motor as it is and increase the power supply voltage. In order to do that voltage increment from the power supply, a booster converter is used. This solution is able to increase the power density of the motor. However, it fails to obtain cost reduction as another component has to be added into the system, which said component tends to be complex and expensive as they need to condition the whole power running from the power supply to the motor. Said approach also fails in the energy usage efficiency as this booster in between the power supply and motor represents an electrical resistance and accumulation which creates some energy loses, affecting negatively the whole system efficiency. This result affect negatively the electric motor worlds point of view, as today's motors actually do have a high level of efficiency but it gets masked by the above mentioned approaches, which drown the whole system efficiency.

Solution to Problem

Since the voltage generated by a motor is proportional to the numbers of turns in a phase winding which limits the speed and current of said motor, it could be said that equally dividing the number of turns of a phase by a number of sub coils, the voltage at each sub coil is the direct proportion of the division. Using the new winding method and arrangement above mentioned, in evenly distributed electrical connections in series of parallel sets or just parallel sets allows to lower the voltage generated as well as the resistance and inductance of the formed phase.

Advantageous Effects of Invention

The new motor winding arrangement opens a whole new field on the management of the electric motor as it is possible to control the different sub coils individually and/or using different switching sequences settings, which change the motors electrical characteristics.

The sub division of the phase opens the possibility of the use of silicon switches which are smaller, faster with less gates charges and losses.

The proposed new electric motor is to allow a system where the power supply from the batteries can feed the motor with no other component than the motor driver to modulate the current supplied, avoiding any device for conditioning the electric potential differences.

BRIEF DESCRIPTION OF DRAWINGS

For explanation purpose but not limited to it, in the following figures, different arrangements of the embodiment for the present patent are described.

FIG. 1 shows an example of winding distribution when sub-coils are coiled in overlapping fashion. Like in all the other cases it is shown the magnetic flux link 120 and 121.

FIG. 2 illustrate how a phase of a motor is coiled around four salient poles 110, 111, 112, 113 each salient poles having an equal number of turns forming sub-coils 200, 210, 220, 230; these sub-coils made from a single wire or a connected series forming a single coil with terminations 130, 131. In this example when energized, the two salient poles 110, 111 are linked by the magnetic flux 120 and the salient poles 112, 113 are linked by the magnetic flux 121.

FIG. 3 shows a division of the single coil phase shown in FIG. 2 (Prior art) in two equal groups of two sub-coils each. The first half phase established by the group formed by the sub-coils 200, 210 are coiled around the salient poles 110, 111 respectively which are linked by the magnetic flux 120 having the terminations 130, 131. The other half phase established by the group formed by the sub-coils 220, 230 are coiled around the salient poles 112, 113 respectively which are linked magnetically by the magnetic flux 121 having the terminations 132, 133.

FIG. 6 shows a comparison chart of speed and amperage between two identical electric motors 12 p 14 n, one was modified using the architecture described in FIG. 4A arrangement 102 and the other one without any modification. Dotted line represents the conventional motor while solid line, the new motor.

DESCRIPTION OF EMBODIMENTS

As shown in FIGS. 3, 4A-4C, and 5A-5C, different approaches for the embodiments of the present patent are possible. Description of FIG. 5A first arrangement 105 as an example of embodiment. Given a specific power supply, this arrangement allows to duplicate the current applicable to an electric motor at a determined speed in comparison with the prior art FIG. 2. It is simple to observe that the total number of turns of the phase in the prior art FIG. 2 and its length is divided in 4 equal groups, which are connected in a way that the resistance and inductance as well as generated current from terminals 130 to 131 and 132 to 133 are half than the mentioned prior art. In addition, the common connection 300 makes the parallel coils to act as one, therefore allowing them to switch at different times and reducing or avoiding the mutual induction interferences. In case of a failure in one of the termination or sub-coil the impedance will be balanced, giving a safe response from the electric motor.

Examples

Figure 4A:
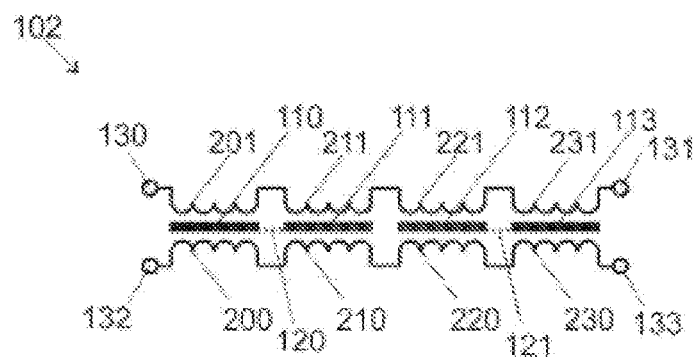
In FIG. 4A, the first arrangement 102 shows a division of the single coil phase shown in FIG. 2 (Prior art) in two equal groups of four sub-coils each. The first group of sub-coils 201, 211, 221, 231 is made from a single wire or a connected series with its terminations 130, 131. The second group of sub-coils 200, 210, 220, 230 is made from a single wire or a connected series with its terminations 132, 133. In the presented arrangement the sub-coils are coiled in pairs formed by one sub-coil of each group per salient pole. The first sub-coils of each group 201, 200 are coiled around the salient pole 110 continued by sub-coils 211, 210 coiled around salient pole 11 followed by sub-coils 221, 220 coiled around salient pole 112 and finally by sub-coils 231, 230 coiled around salient pole 113. The pair of sub-coils of each group are coiled either in overlapping or sectioned fashion. Like in all the other cases it is shown the magnetic flux link 120 and 121.
Figure 4B:
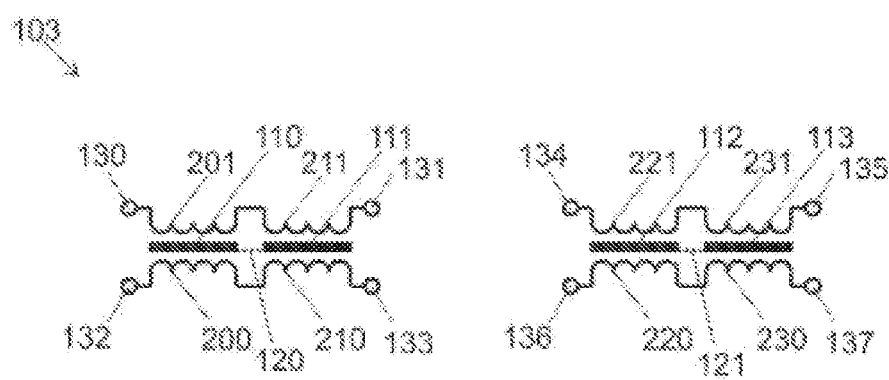
In FIG. 4B, the second arrangement 103 shows a deeper subdivision, in four equal halves forming four groups of two sub-coils each. The first group of sub-coils 201, 211 is made from a single wire or a connected series with its terminations 130, 131. The second group of sub-coils 200, 210 is made from a single wire or a connected series with its terminations 132, 133. The third group of sub-coils 221, 231 is made from a single wire or a connected series with its terminations 134, 135. The fourth group of sub-coils 220, 230 is made from a single wire or a connected series with it terminations 136, 137. In the presented arrangement the sub-coils are coiled in pairs formed by one sub-coil from two of the groups per salient pole. The sub-coils 201, 200 are coiled around the salient pole 110 continued by sub-coils 211, 210 coiled around salient pole 111. The sub-coils 221, 220 are coiled around salient pole 112 and finally by sub-coils 231, 230 coiled around salient pole 113. The pairs of sub-coils are coiled either in overlapping or sectioned fashion. Like in all the other cases it is shown the magnetic flux link 120 and 121.
Figure 4C:
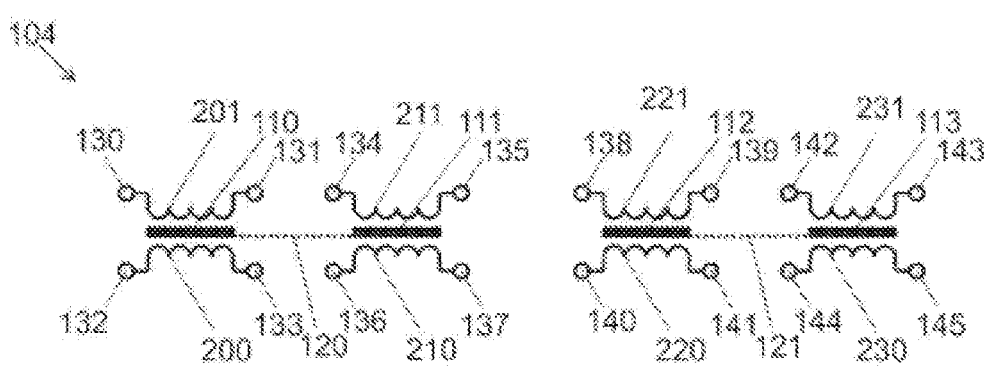
In FIG. 4C, the third arrangement 104 shows a different subdivision, in four equal groups of two sub-coils each. The first group of sub-coils 201, 200 each one with its terminations. 130 and 131 for sub-coil 201 and 132, 133 for sub-coil 200. The second group of sub-coils 211, 210 each one with its terminations, 134 and 135 for sub-coil 211 and 136, 137 for sub-coil 210. The third group of sub-coils 221, 220 each one with its terminations, 138 and 139 for sub-coil 221 and 140, 141 for sub-coil 220. The fourth group of sub-coils 231, 230 each one with its terminations. 142 and 143 for sub-coil 231 and 144, 145 for sub-coil 230. In the presented arrangement the pairs of sub-coils of a group are coiled in a salient pole. The sub-coils 201, 200 are coiled around the salient pole 110, the sub-coils 211, 210 coiled around salient pole 111. The sub-coils 221, 220 are coiled around salient pole 112, the sub-coils 231, 230 coiled around salient pole 113. The pairs of sub-coils are coiled either in overlapping or sectioned fashion. Like in all the other cases it is shown the magnetic flux link 120 and 121.
Figure 5A:
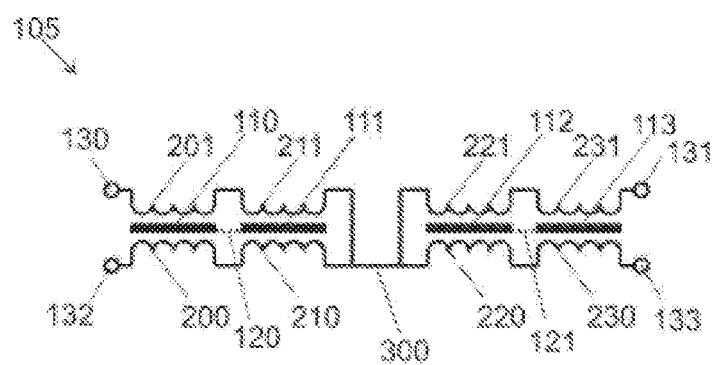
In FIG. 5A, the first arrangement 105 shows a different subdivision of the single coil phase shown in FIG. 2 (Prior art) in four equal groups of two sub-coils each. The first group of sub-coils 201, 211 is made from a single wire or a connected series with the termination 130 and the other end connected to the common connection 300. The second group of sub-coils 200, 210 is made from a single wire or a connected series with the termination 132 and the other end connected to the common connection 300. The third group of sub-coils 221, 231 is made from a single wire or a connected series with the termination 131 and the other end connected to the common connection 300. The fourth group of sub-coils 220, 230 is made from a single wire or a connected series with the termination 133 and the other end connected to the common connection 300. In the presented arrangement the sub-coils are coiled in pairs formed by one sub-coil of each group per salient pole. The sub-coils 201, 200 are coiled around the salient pole 110 continued by sub-coils 211, 210 coiled around salient pole 111. The sub-coils 221, 220 are coiled around salient pole 112 and followed by sub-coils 231, 230 coiled around salient pole 113. The pairs of sub-coils are coiled either in overlapping or sectioned fashion. Like in all the other cases it is shown the magnetic flux link 120 and 121.
Figure 5B:
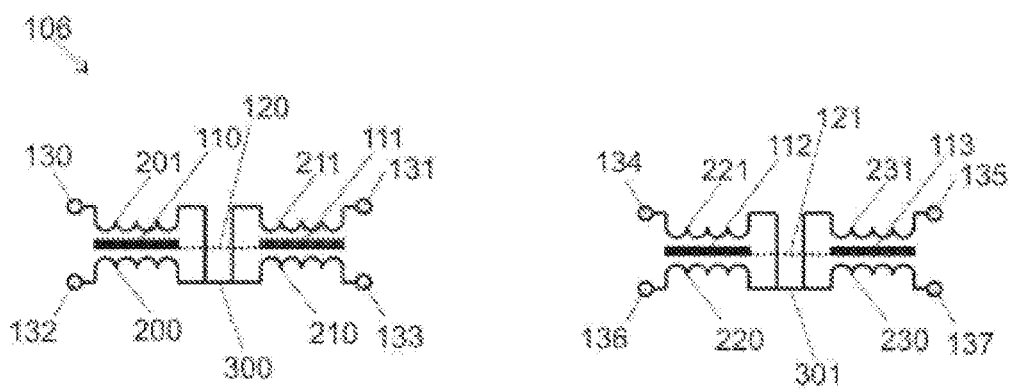
In FIG. 5B, the second arrangement 106 shows a deeper subdivision, in two groups of four sub-coils each. The first group of sub-coils 201, 211, 200, 210 connected in one end to a common connection 300 with its terminations 130, 131, 132, 133 respectively on the other end. The second group of sub-coils 221, 231, 220, 230 connected in one end to a common connection 301 with its terminations 134, 135, 136, 137 respectively on the other end. In the presented arrangement the sub-coils are coiled in pairs formed by one sub-coil from two of the groups per salient pole. The sub-coils 201, 200 are coiled around the salient pole 110, sub-coils 211, 210 coiled around salient pole 111. The sub-coils 221, 220 are coiled around salient pole 112 and the sub-coils 231, 230 coiled around salient pole 113. The pairs of sub-coils are coiled either in overlapping or sectioned fashion. Like in all the other cases it is shown the magnetic flux link 120 and 121.
Figure 5C:
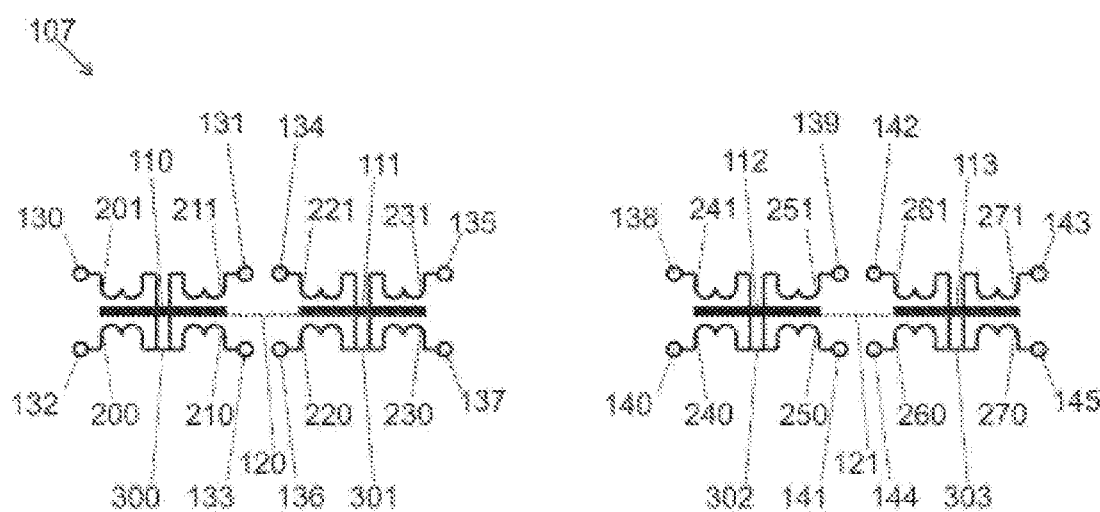
In FIG. 5C, the Third arrangement 107 shows an even deeper subdivision, in four groups of four sub-coils each. The first group of sub-coils 201, 211, 200, 210 connected in one end to a common connection 300 with its terminations 130, 131, 132, 133 respectively on the other end. The second group of sub-coils 221, 231, 220, 230 connected in one end to a common connection 301 with its terminations 134, 135, 136, 137 respectively on the other end. The third group of sub-coils 241, 251, 240, 250 connected in one end to a common connection 302 with its terminations 138, 139, 140, 141 respectively on the other end. The fourth group of sub-coils 261, 271, 260, 270 connected in one end to a common connection 302 with its terminations 142, 143, 144, 145 respectively on the other end. In the presented arrangement the sub-coils are coiled in pairs formed by one sub-coil from two of the groups per salient pole. The sub-coils 201, 200, 211, 210 are coiled around the salient pole 110, sub-coils 221, 220, 231, 230 coiled around salient pole 111. The sub-coils 241, 240, 251, 250 are coiled around salient pole 112 and the sub-coils 261, 260, 271, 270 coiled around salient pole 113. The pairs of sub-coils are coiled either in overlapping or sectioned fashion. Like in all the other cases it is shown the magnetic flux link 120 and 121.

As an example an electric motor 12 p 14 n using the architecture described in FIG. 4A arrangement 102 was built and tested against one of the same without any modifications. The motors were driven by the same conventional electric motor driver, which wasn't able to manage efficiently the new motor due to its low resistance and inductance but enough to demonstrate the above mentioned improvement of power density. During the whole evaluation the same power supply was used at the exact same voltage in all cases.

TABLE 1

| FREQ | Prior art Delta Amp | FIG. 4. 102 Amp | RPM |
| --- | --- | --- | --- |
| 0 | 0 | 0 | 0 |
| 50 | 0.0769 | 0.0997 | 429 |
| 100 | 0.1669 | 0.2092 | 857 |
| 150 | 0.2669 | 0.3217 | 1286 |
| 200 | 0.3769 | 0.4372 | 1714 |
| 250 | 0.4969 | 0.5557 | 2143 |
| 300 | 0.6269 | 0.6772 | 2571 |
| 350 | 0.7669 | 0.8017 | 3000 |
| 400 | 0.9169 | 0.9292 | 3429 |
| 450 | 1.0769 | 1.0597 | 3857 |
| 500 | 1.2469 | 1.1932 | 4286 |
| 550 | 1.4269 | 1.3297 | 4714 |
| 600 | 1.6169 | 1.4692 | 5143 |
| 650 |  | 1.6117 | 5571 |
| 700 |  | 1.7572 | 6000 |

TABLE 1-continued

| FREQ | Prior art Delta Amp | FIG. 4. 102 Amp | RPM |
| --- | --- | --- | --- |
| 750 |  | 1.9057 | 6429 |
| 800 |  | 2.0572 | 6857 |
| 850 |  | 2.2117 | 7286 |
| 900 |  | 2.3692 | 7714 |
| 950 |  | 2.5297 | 8143 |
| 1000 |  | 2.6932 | 8571 |
| 1050 |  | 2.8597 | 9000 |
| 1100 |  | 3.0292 | 9429 |

The invention claimed is:

1. An electric motor, said electric motor comprising:
a rotor,
a stator comprising a stator core with a plurality of salient stator poles arranged in groups as a number of motor electrical phases,
the stator poles group having an equal number of poles,
each group of stator poles comprising at least one stator pole, the electrical phase being split into groups,
each electrical phase having at least one electrical phase group,
each electrical phase group being formed by a plurality of series of electric coils, each series of coils in the electrical phase group having an equal number of turns,
wherein the plurality of series of electric coils is divided into at least four subgroups, each subgroup being a physically separate and continuous wire having an equal number of sub-coils in series and comprising at least two sub-coils,
wherein each subgroup has a first end and a second end, each of the first ends of the subgroups are connected together to create a common connection (300), and each second end of each subgroup being an exposed termination of the physically separate and continuous wire so as to create a plurality of exposed terminations (130, 131, 132, 133) where a first pair of the plurality of exposed terminations (130, 132) that are linked by a first magnetic flux and a second pair of the plurality of exposed terminations (131, 133) linked by a second magnetic flux.

2. The electric motor of claim 1 wherein the plurality of series of electric coils are connected in parallel.

3. The electric motor of claim 1 wherein the plurality of series of electric coils are connected in series.

4. The electric motor of claim 1 wherein the at least four subgroups are connected in series.

5. The electric motor of claim 1 wherein no additional component other than a motor driver is used to modulate current supplied to the electric motor.

6. The electric motor of claim 1 wherein no device is required for conditioning an electric potential difference.

7. The electric motor of claim 1 wherein the electric motor is configured to achieve a speed of at least 900 RPM.

8. The electric motor of claim 1 wherein the electric motor is configured to achieve an amperage of at least 3 amp.

* * * * *